United States Patent
Plawecki et al.

(10) Patent No.: US 8,311,689 B2
(45) Date of Patent: Nov. 13, 2012

(54) PROTECTION AGAINST EXCEEDING THE BRAKING CAPABILITY OF REMOTE CONTROLLED LOCOMOTIVES

(75) Inventors: Daniel W. Plawecki, Ocala, FL (US); John W. Brand, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 1350 days.

(21) Appl. No.: 11/315,764

(22) Filed: Dec. 21, 2005

(65) Prior Publication Data

US 2007/0142984 A1    Jun. 21, 2007

(51) Int. Cl.
*G05D 3/00*    (2006.01)
*B60T 7/12*    (2006.01)

(52) U.S. Cl. ............... 701/20; 701/96; 701/301; 701/2; 701/70; 701/23

(58) Field of Classification Search ................ None
See application file for complete search history.

(56) References Cited

U.S. PATENT DOCUMENTS

| | | | | |
|---|---|---|---|---|
| 4,041,283 A * | 8/1977 | Mosier | ........................... | 701/20 |
| 4,279,395 A * | 7/1981 | Boggio et al. | ............ | 246/182 R |
| 5,511,749 A * | 4/1996 | Horst et al. | ............... | 246/187 A |
| 5,549,364 A * | 8/1996 | Mayr-Frohlich et al. | .... | 303/9.69 |
| 6,144,901 A * | 11/2000 | Nickles et al. | .................. | 701/19 |
| 6,449,536 B1 | 9/2002 | Brousseau et al. | | |
| 6,580,976 B1 * | 6/2003 | Belcea | ........................... | 701/20 |
| 6,587,764 B2 * | 7/2003 | Nickles et al. | .................. | 701/19 |
| 6,622,068 B2 * | 9/2003 | Hawthorne | ..................... | 701/19 |
| 6,789,004 B2 | 9/2004 | Brousseau et al. | | |
| 6,853,889 B2 * | 2/2005 | Cole | ............................... | 701/19 |
| 7,034,476 B2 * | 4/2006 | Wang et al. | ................... | 318/139 |
| 7,089,093 B2 * | 8/2006 | Lacote et al. | ................... | 701/19 |
| 7,202,797 B2 * | 4/2007 | Zhavi | ......................... | 340/686.1 |
| 7,359,770 B2 * | 4/2008 | Cole | ............................... | 701/19 |
| 2001/0029411 A1 * | 10/2001 | Hawthorne | ..................... | 701/19 |
| 2003/0105561 A1 * | 6/2003 | Nickles et al. | .................. | 701/19 |
| 2004/0064235 A1 * | 4/2004 | Cole | ............................... | 701/70 |
| 2004/0238693 A1 | 12/2004 | Cole | | |
| 2006/0030978 A1 * | 2/2006 | Rajaram | ......................... | 701/19 |

FOREIGN PATENT DOCUMENTS

DE    101 05 638    8/2002

OTHER PUBLICATIONS

EIC Updated Fast-Focus EAST Search; Apr. 25, 2012.*

* cited by examiner

*Primary Examiner* — Ian Jen
(74) *Attorney, Agent, or Firm* — GE Global Patent Operation; John A. Kramer

(57) ABSTRACT

A method for controlling a remote controlled locomotive that is part of a train to insure effective braking, the method including calculating an estimated total energy of a train, calculating a threshold representing a predetermined braking capability limit of the locomotive, determining whether the estimated total energy is at least one of approaching and exceeding the threshold, and decreasing a velocity of the train until the threshold is at least one of no longer being approached and is no longer exceeded.

13 Claims, 4 Drawing Sheets

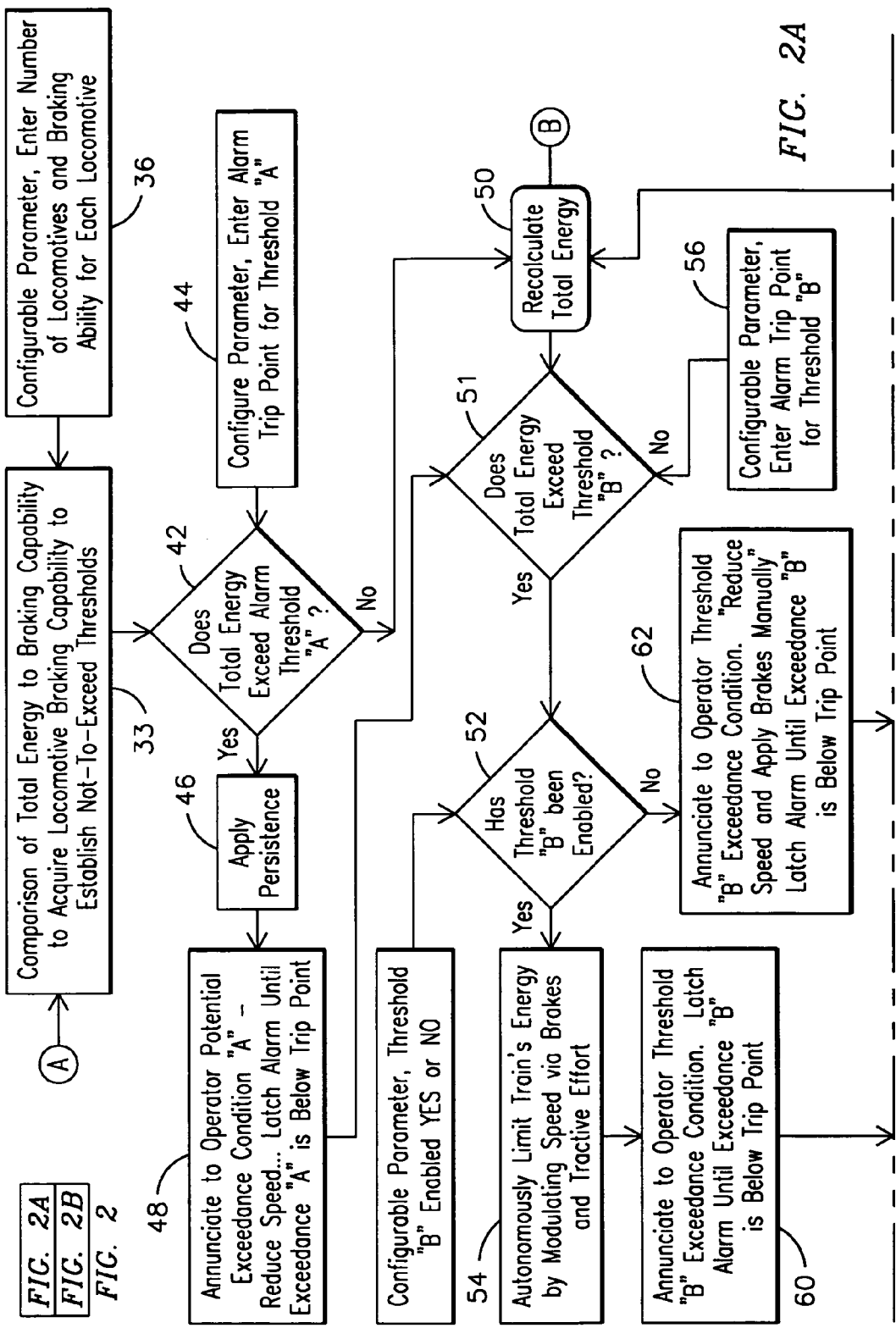

PROTECTION AGAINST EXCEEDING THE BRAKING CAPABILITY OF REMOTE CONTROLLED LOCOMOTIVES

FIELD OF INVENTION

This invention relates generally to the field of rail transportation and, more particularly, to a method, computer program, and system for effectively controlling a remote controlled locomotive that is part of a train.

BACKGROUND OF THE INVENTION

The remote control operation of a locomotive is useful for allowing a ground-based operator to control the locomotive from trackside when the locomotive is in a switching yard. A remote control unit typically includes one or more handheld transmitting units (e.g., "Handheld Transmitting Unit 168" in FIG. 3) for communicating with a controller on the locomotive. This type of system permits an operator to perform such operations as coupling and uncoupling cars from the train the locomotive is connected to, while retaining control over the speed of the locomotive, and thus the train, by manually regulating the throttle and brake systems.

Events have occurred where an operator has failed to properly stop a remote controlled locomotive (RCL) because the operator did not properly consider the combined affect of weight and/or speed of the train combined with the influence of grade with respect to locomotive braking capability. These events have resulted in train movement where the braking capability of the locomotive independent and emergency brakes are exceeded further resulting in collisions and overruns where there have been potentially catastrophic results.

BRIEF DESCRIPTION OF THE INVENTION

This invention is directed towards a method, computer program and system for effectively controlling a remote controlled locomotive that is part of a train. Towards this end a method for controlling a remote controlled locomotive that is part of a train to insure effective braking is disclosed. The method comprises a step for calculating an estimated total energy of a train. A step for calculating a threshold representing a predetermined braking capability limit of the locomotive is also disclosed. Steps for determining whether the estimated total energy is at least one of approaching and exceeding the threshold, and decreasing a velocity of the train until the threshold is at least one of no longer being approached and is no longer exceeded are also disclosed.

A computer readable media containing program instructions for remotely controlling a remote controlled locomotive that is part of a train that has at least one of excessive weight and operating at an excessive speed and with a computer as part of the locomotive that can control operation of the locomotive is further disclosed. The computer readable media comprises several computer program codes. Such computer program codes include a computer program code for calculating an estimated total energy of a train, and a computer program code for calculating a threshold representing a predetermined braking capability limit of the locomotive. A computer program code for determining whether the estimated total energy is at least one of approaching and exceeding the threshold, and a computer program code for decreasing a velocity of the train until the threshold is at least one of no longer being approached and is no longer exceeded are also disclosed.

A monitoring and control system for controlling a remote controlled locomotive that is part of a train having at least one of excessive weight and operating at an excessive speed is disclosed. The system comprises a first sensor for detecting work output data from the locomotive, and a second sensor for measuring a speed of the locomotive. A processor is further disclosed for accepting work output data from the first sensor and speed of the locomotive from the second sensor so as use a program to estimate a weight of the train based on the work output data and to calculate an acceptable stopping distance based on the estimated train weight, locomotive speed, and an elevation grade. The processor factors at least a second time estimated train weight, locomotive speed, and elevation grade to determine whether the train can stop within the acceptable stopping distance.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

With reference to the figures, exemplary embodiments of the invention will now be described. However, it should be noted that though the present invention describes various embodiments, namely a method, computer program, and system, those skilled in the art will readily recognize that the invention can be implemented where each embodiment may overlap. Towards this end, the exemplary embodiments discussed herein should not be viewed as individual embodiments but the intent of the elements of the present invention shall be used collectively as well, wherein the method steps may be exchanged with computer software elements and/or with hardware elements.

Furthermore, it should be realized that the present invention may be completely autonomous or may include a mixture of autonomous action and manual action. Towards this end, those skilled in the art will recognize that technology used in the present invention is predictive in nature and is useful in providing an early estimation, based on conditions, if the sum total of potential and kinetic energy of a train is approaching or exceeds the braking capability of the locomotive moving the train prior to the train actually entering an energy state that is unstoppable within acceptable limits based on braking limitations of the locomotive.

In an exemplary embodiment, the present invention is software based logic. The present invention resides in the same application software used to control a remote controlled locomotive. As is disclosed below, the software is configured to allow a user to determine a degree and type of protection to be used.

Figure 1:
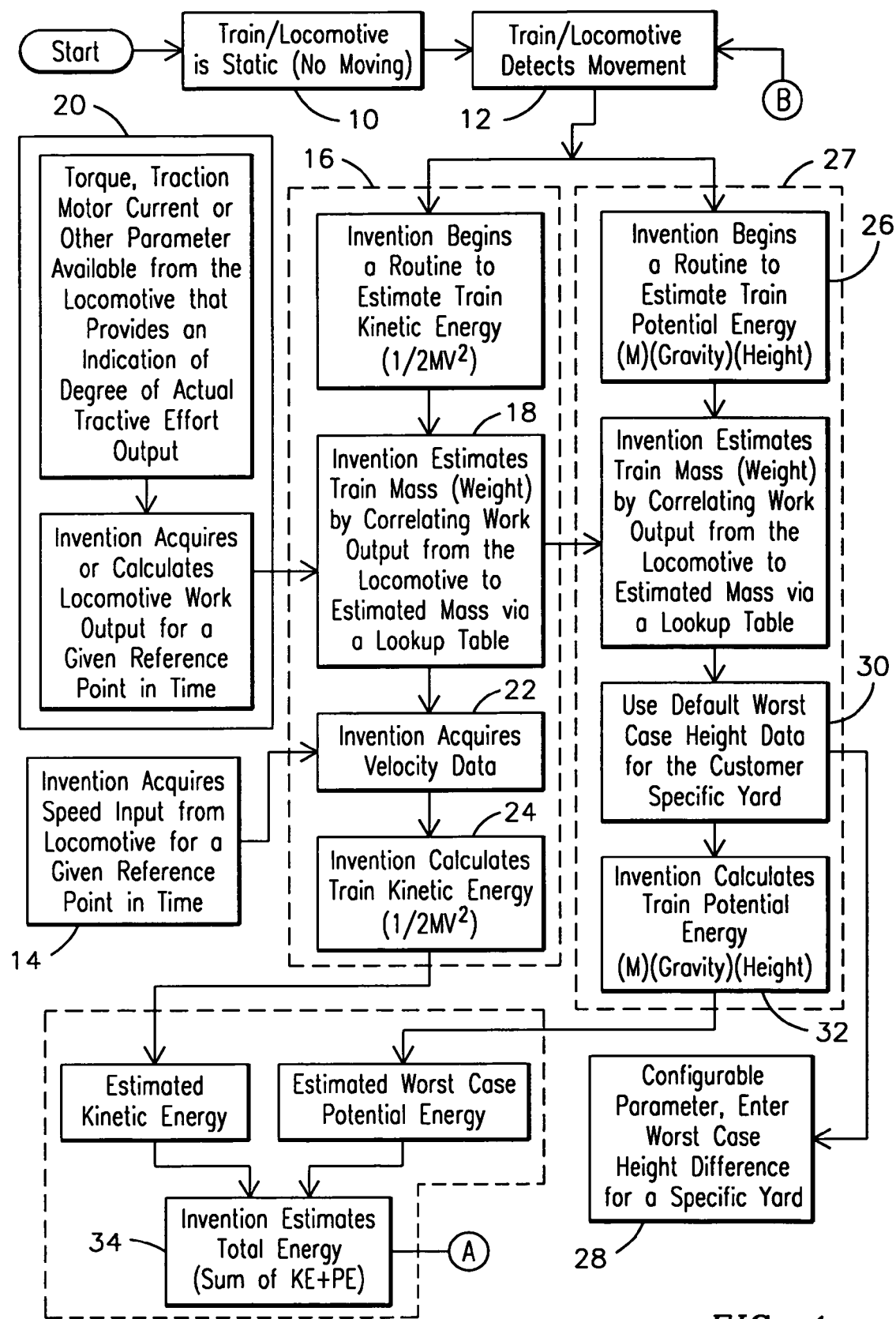
FIG. 1 depicts a flow chart illustrating exemplary steps of the present invention.
Figure 2B:
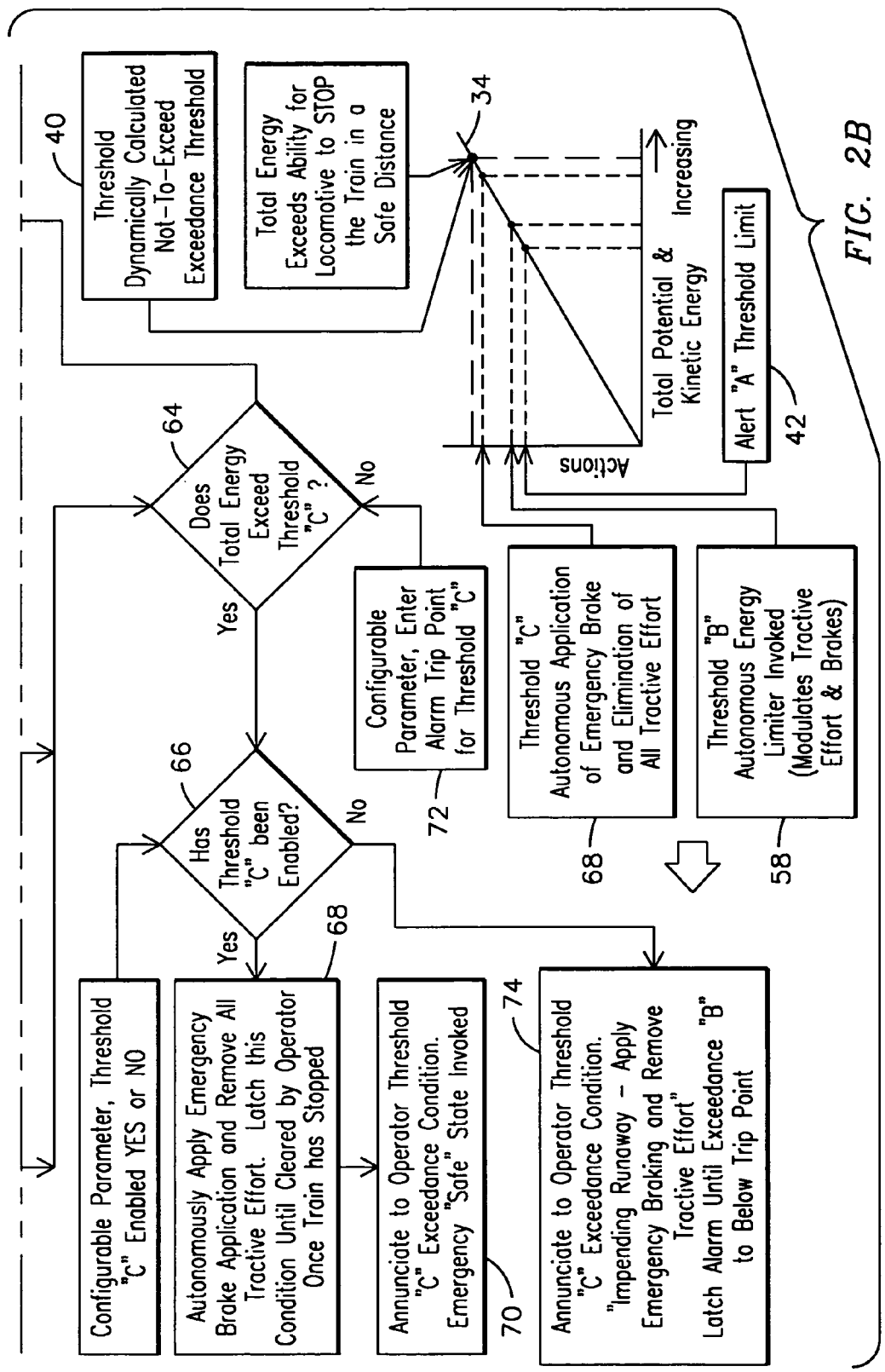
FIG. 2 depicts a continuation of the flow chart in FIG. 1 further illustrating exemplary steps of the present invention.

FIGS. 1 and 2 depict a flow chart illustrating exemplary steps of the present invention. As illustrated, the invention is essentially dormant, Step 10, while the locomotive is not moving but initiates when the locomotive moves, Step 12. The indication of movement is determined by monitoring locomotive speed data. This may be accomplished by either acquiring velocity data, Step 14, as discussed below, or by monitoring when a locomotive wheel begins to rotate. Estimated kinetic energy from the train is calculated, Step 16.

In order to estimate kinetic energy, an exemplary equation for Kinetic Energy is used, such as but not limited to:

Kinetic Energy $=\frac{1}{2}MV^2$ where M=mass of the train; and

V=Velocity or speed of the train.

To solve the kinetic energy equation, the mass of the train must be known, Step 18. Since train mass is not readily available, the present invention acquires an indication of work output from the locomotive, Step 20. Work output can be derived from, but not limited to, torque, tractive motor current, or any other parameters as long as work output from the locomotive can be derived. With the indication of locomotive work output at the time of initial movement, a comparison of the acquired work output of the locomotive to the acquired locomotive speed, Step 22, is made using a two dimensional calibrated look-up table 170 (shown in FIG. 3) that will yield an estimated train weight based on the locomotive work output and speed parameter. Thus, when locomotive movement is detected, the amount of work that the locomotive is outputting at a specific point in time along with the speed of the locomotive at the same specific point in time is compared to a calibrated look-up table 170 in order to derive an estimate of train mass. With a value of mass derived, the present invention is then able to solve the Kinetic Energy equation, Step 24.

Concurrently while calculating Kinetic Energy at a specific point in time, a calculation is made, Step 26, to estimate the train's worst-case potential energy in synchronization with the same point in time that the kinetic energy solution is executed, Step 27. An estimation is made regarding a worst-case potential energy by using an equation for Potential Energy, such as, but not limited to:

Potential Energy=($M$)(Gravity)(Height)

where M=the estimated train mass at the specific point in time acquired, Step 18;

Gravity=constant; and

Height=a worst-case elevation difference in a specific rail yard of operation.

Since the Height is a variable, it is a configurable parameter where a user may enter a value based on yard-of-operation worst-case elevation differences, Step 28. If a reasonable value for Height is not entered, then the present invention will assume a worst-case default Height value, Step 30. In another exemplary embodiment, the Height variable is predetermined, or is a non-configurable parameter. In another exemplary embodiment, as disclosed below, the Height variable is determined by a remote sensor device 137. An estimated value for potential energy is calculated, Step 32, that is relative to the same point in time that a calculation was done to estimate kinetic energy, Step 24.

Towards this end, a summation of the value for kinetic energy and potential energy to derive a total energy value at a specific point in time, Step 34, is made. With an estimate of total train energy at a specific point in time, the present invention compares the total energy value, Step 33, to the braking capability of the locomotives which is inputted by a user as a configurable parameter, Step 36. A not-to-exceed energy state, Step 40, is then derived based on the braking capability of the locomotive(s). A comparison is then made between the current total energy state of the train to the not-to-exceed energy state in order to derive available margin before a run-away train scenario occurs. This margin is evaluated to a series of thresholds that result in some additional action to be taken.

The first threshold is designated as alarm threshold "A", Step 42. Threshold "A" is a user configurable trip point limit, Step 44, that is intended to provide the user with a first visual and/or audible indication that the available braking margin is approaching an unacceptable level. Upon an exceedance of the threshold "A" established trip point, the present invention will apply configurable persistence logic, or de-bounce logic, to this exceedance, Step 46. Those skilled in the art will recognize the purpose of persistence logic. Specifically, persistence logic as used in the present invention determines whether approaching or breaching the exceedance of the threshold "A" is valid by insuring that approaching and/or breaching the exceedance is persistent over a given period of time. This logic is used to protect against false command action, that is typically due to, but not limited to, noise, electromagnetic interference, and other software and communication anomalies. Once the persistence logic is satisfied, the computer program will then issue a visual and/or audible output to the user indicating that a trip point "A" has been exceeded and to reduce speed and apply braking to reduce the train's total energy, Step 48. If the total energy state of the train is below the alarm threshold "A" trip point, the present invention will continue to evaluate the total energy state of the train, Step 50.

If alarm threshold "A" exceeds the trip point and satisfies the persistence logic, Step 46, and annunciates an alarm, Step 48, the present invention will then continue to evaluate the total energy exceedance condition to determine if threshold "B" has been exceeded, Step 50. Threshold "B" is a user configurable option that must be set to trip at a higher energy state than threshold "A". The intent is that threshold "B" is where an autonomous corrective control action will be automatically invoked if the user has enabled this function, Step 52. If the user has selected "enable" for threshold "B", then an attempt to apply braking and reduce tractive effort so as to modulate the total energy below the alarm threshold "B" trip point, Step 54, is undertaken.

If the user elects to disable the autonomous corrective control, Step 52, then no autonomous corrective control will be applied, but rather a message will appear indicating that the train has exceeded threshold "B" and that immediate speed reduction and/or brake application is necessary to prevent a runaway condition. The trip point of threshold "B" may be user configured to give more or less of a margin between trip and a not-to-exceed limit, Step 56. If a determination is made, Step 58, that an exceedance has not occurred, then evaluation of the total energy state, Step 50, will continue. If a determination is made, Step 51, that an exceedance of threshold "B" has occurred, and the user has enabled autonomous action, Step 52, autonomous action is invoked to make an attempt at controlling the total train energy level to reduce the total train energy below threshold "B" trip point.

Additionally, an annunciation to the user is issued indicating that threshold "B" has been exceeded, Step 60. This annunciation will remain activated until the total train energy state is below the threshold "B" trip point. If the user has disabled autonomous control, Step 52, then no autonomous control action will be taken to manage the total train energy state below the threshold "B" trip point. Instead an alarm, Step 62, will be presented to the user that indicates the operator must manually apply brakes and reduce tractive effort to prevent a runaway condition.

The train's total energy will continue to be evaluated for an exceedance of threshold "C" trip point, Step 64. Threshold "C" is the point that the train is calculated to have accumulated a significant amount of total energy and that if immediate action in the form of removal of all tractive effort in combination with the application of emergency braking is not implemented, then an immanent train runaway condition is likely to occur. Similar to threshold "B", threshold "C" is also configurable by the user. If the user enables threshold "C", Step 66, then once an exceedance of the threshold "C trip point occurs, tractive effort and an emergency application of the brakes will be applied, Step 68.

An annunciation is provided to the user that the train was placed in an emergency state because of a threshold "C" exceedance, Step 70. Again similar to threshold "B", threshold "C" trip point is also user configurable, Step 72, to provide user desired operating margins prior to the autonomous invoking of an emergency. If the user has not enabled autonomous control action in the event of a threshold "C exceedance, Step 66, then no autonomous control action will occur, and the operator will receive a message, Step 74, to manually invoke an emergency brake application or else risk a train runaway condition.

The system may also be configured such that if the train approaches too close to the exceedance threshold, the locomotive will be commanded to stop and the brakes can not be released or tractive effort applied until one of the conditional factors influencing the energy state of the train (most likely weight or speed) is further controlled. This may mean that mass and/or weight, must be removed from the train. In another exemplary embodiment further operations will restrict a speed the train can reach.

Based on the foregoing specification, the methods described above may be implemented using computer programming or engineering techniques including computer software, firmware, hardware or any combination or subset thereof, wherein the technical effect is to provide a system for effectively controlling a remote controlled locomotive that is part of a train. Any such resulting program, having computer-readable code means, may be embodied or provided within one or more computer-readable media, thereby making a computer program product, i.e., and an article of manufacture, according to the invention. For example, as disclosed herein, the computer-readable media may include a computer program code for accessing a railroad elevation grade database comprising a plurality of elevation grade data associated with respective geographic locations and/or look-up tables 170 (shown in FIG. 3) specific to a locomotive.

The computer-readable media may be, for example, a fixed (hard) drive, diskette, optical disk, magnetic tape, semiconductor memory, such as read-only memory (ROM), etc., or any transmitting/receiving medium, such as the Internet or other communication network or link. The article of manufacture containing the computer code may be made and/or used by executing the code directly from one medium, by copying the code from one medium to another medium, or by transmitting the code over a network.

One skilled in the art of computer science will be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

Figure 3:
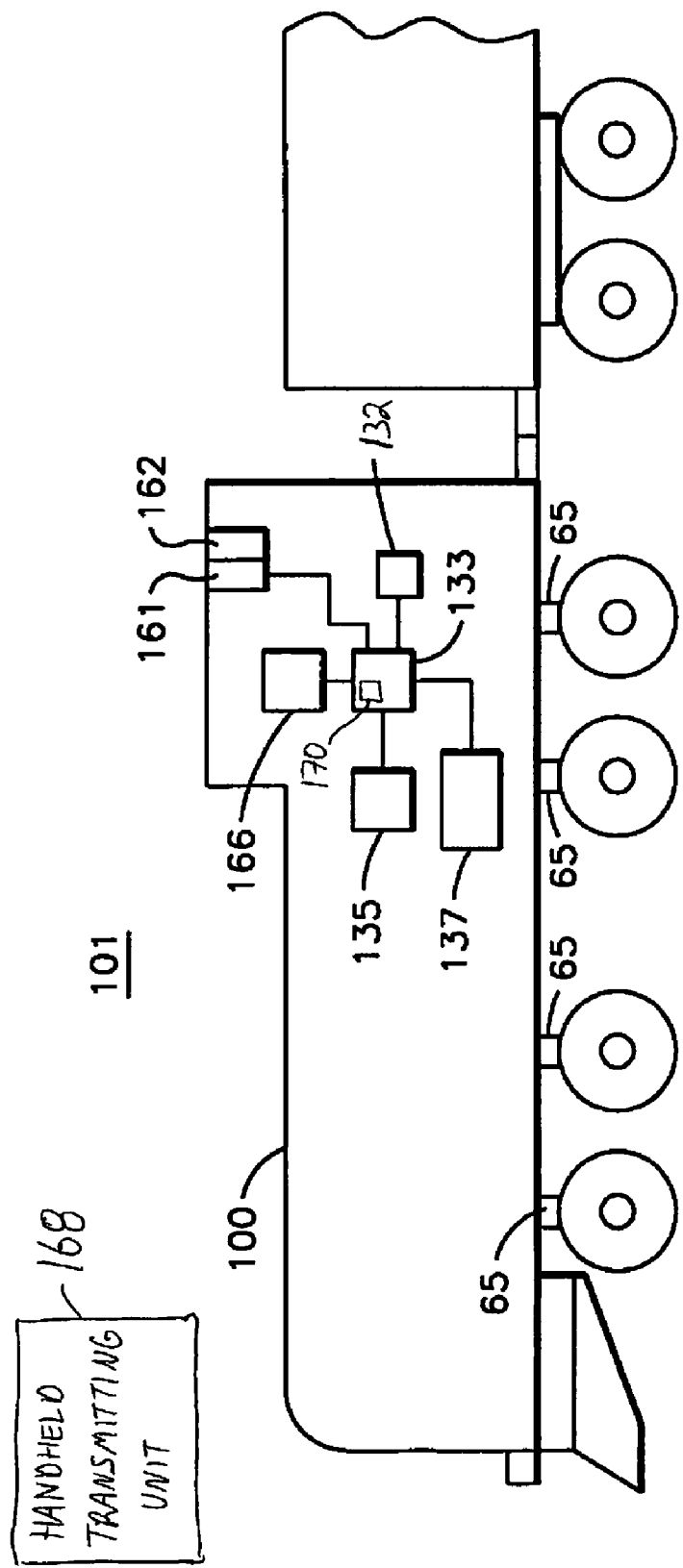
FIG. 3 depicts exemplary elements that may comprise the present invention.

FIG. 3 depicts elements, such as hardware components, that may be used in the present invention. A sensor 132 for detecting work output from a locomotive is provided. In another exemplary embodiment this first sensor is simply connections that supply the work output data to a processor 133 discussed below. A second sensor 135 for determining a locomotive speed is also provided. A processor 133 is also included. The processor 133 accepts data from the sensors regarding work output data and speed data where the data is used in the processor 133 to calculate an estimated weight of the train 101. The processor 133 then is used to calculate an acceptable stopping distance based on the estimated train weight, locomotive speed, and an elevation grade. The elevation grade is either entered by a user, or by a remote elevation determinator 137. Examples of a remote elevation determinator were discussed above. The processor 133 will continue to evaluate train weight, locomotive speed, and elevation grade so as to determine whether the train can stop within the already calculated acceptable stopping distance.

When a determination is made that the train 101 cannot stop within the calculated acceptable stopping distance, a warning is issued. This warning is accomplished with a visual warning system 161 and/or an audible warning system 162. At the same time, one of two approaches is being taken to immobilize the train 101. In one approach the locomotive 100 is being commanded to enter a park-state. In this state, the locomotive 100 is slowed until it has stopped. In another approach the processor 133 commands that zero tractive effort is applied by the locomotive 100 and independent brakes 165 are applied to stop and/or at least slow the train 101 until an acceptable speed is reached. A data recording device 166 is also present. The data recording device 166 can record any of events that occur while the locomotive 100 is remotely controlled. This includes the work output data, locomotive speed, calculated stopping distance, and when the train exceeds the calculated stopping distance.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A system comprising:
    a first sensor for detecting work output data from a remote controlled locomotive that is part of a train;
    a second sensor for measuring a speed of the locomotive; and
    a processor for accepting work output data from the first sensor and speed of the locomotive from the second sensor to estimate a weight of the train based on the work output data and to calculate an acceptable stopping distance based on the weight of the train that is estimated, the speed of the locomotive, and an elevation grade, the processor configured to estimate the weight of the train by using a look-up table that compares a tractive load of a locomotive drive motor to the speed of the locomotive;
    wherein the remote controlled locomotive is controlled via a handheld transmitting unit;
    wherein the processor is configured to factor, at least a second time, the weight of the train that is estimated, the speed of the locomotive, and the elevation grade to determine whether the train can stop within the acceptable stopping distance.

2. The system of claim 1 further comprising at least one of a visual warning system or an audible warning system that is configured to provide a warning when the train cannot stop within the acceptable stopping distance.

3. The system of claim 1 wherein the processor is configured to autonomously command the locomotive to at least one of stop or decrease velocity.

4. The system of claim 1 wherein the processor is configured to autonomously command a zero tractive effort and command application of brakes to stop the train when the processor determines that the train cannot stop within the acceptable stopping distance.

5. The system of claim 1 further comprising a data recording device configured to record event data specific to at least one of the work output, the speed of the locomotive, the weight of the train that is estimated, or the acceptable stopping distance to a storage device.

6. The system of claim 1 wherein the first sensor is configured to detect the work output data by acquiring and monitoring at least one of torque or tractive motor current from the locomotive.

7. The system of claim 1 wherein the elevation grade is pre-selected by a user.

8. The system of claim 1 further comprising a remote elevation grade determining device configured to provide the elevation grade.

9. The system of claim 8 wherein the elevation grade determining device includes a global positioning system receiver disposed onboard the train.

10. The system of claim 1, wherein the processor is configured to use the default height value when a reasonable value for the height value is not received by the processor.

11. The system of claim 1, wherein the processor is configured, responsive to a determination that the train cannot stop within the acceptable stopping distance, to control at least one of a visual warning system or an audible warning system for issuing a warning.

12. The system of claim 1, wherein the processor is configured, responsive to a determination that the train cannot stop within the stopping distance, to automatically control the locomotive to at least one of slow the train or bring the train to a stop.

13. A system comprising:
a first sensor for detecting work output data from a locomotive that is part of a train;
a second sensor for measuring a speed of the locomotive; and
a processor for accepting work output data from the first sensor and speed of the locomotive from the second sensor to estimate a weight of the train based on the work output data and to calculate an acceptable stopping distance based on the weight of the train that is estimated, the speed of the locomotive, and an elevation grade, the processor configured to estimate the weight of the train by using a look-up table that compares a tractive load of a locomotive drive motor to the speed of the locomotive;
wherein the processor is configured to factor, at least a second time, the weight of the train that is estimated, the speed of the locomotive, and the elevation grade to determine whether the train can stop within the acceptable stopping distance.

* * * * *